Patented Feb. 21, 1928.

1,660,001

UNITED STATES PATENT OFFICE.

MELVIN DE GROOTE, OF ST. LOUIS, AND BERNHARD KEISER, OF WEBSTER GROVES, MISSOURI, ASSIGNORS TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.   Application filed December 31, 1926.   Serial No. 158,409.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines, dispersed in a more or less permanent state throughout the oil which constitutes the continuous phase of the emulsion. They are obtained from producing wells and from the bottoms of oil storage tanks and are commonly referred to as "cut oil," "roily oil," "emulsified oil" and "bottom settlings."

The object of our invention is to provide a novel and inexpensive process for separating emulsions of the character referred to into their component parts of oil and water or brine.

Briefly described, our process consists in subjecting a petroleum emulsion to the action of a demulsifying agent consisting of a mixture composed of ordinary commercial cresol or cresylic acid and modified oleic acid bodies containing an appreciable quantity of sulpho-oleic acid, so as to cause the emulsion to break and separate into its component parts of oil and water or brine, when the emulsion is permitted to remain in a quiescent state after treatment.

In practising our process a treating agent or demulsifying agent of the kind mentioned is brought into contact with the emulsion either by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an old storage tank. In some instances it may be advisable to introduce the treating agent into a producing well in such a way that it will become mixed with water and oil that is emerging from the surrounding strata, before said water and oil enter the barrel of the well pump or the tubing up through which said water and oil flow to the surface of the ground. After treatment the emulsion is allowed to stand in a quiescent state at a suitable temperature so as to permit the water or brine to separate from the oil, or the treated emulsion may be acted on by one or the other of the various kinds of apparatus now used in the operation of breaking petroleum emulsions, such as homogenizers, hay tanks, gun barrels, filters, centrifuges or electrical dehydrators.

The prior art relating to the treatment of petroleum emulsions disclosed the use of various substances, and mixtures or combinations of various substances, which it is alleged will act as demulsifying agents to effect the separation of the component parts of a petroleum emulsion. It has been our experience in treating petroleum emulsions on a commercial scale that a mixture of substances of known treating value generally produces a demulsifying agent that is not as efficient as the individual substances of which the mixture is composed, and moreover, that the result produced by combining two or more substances of known treating value is not always obvious, and in fact, is often quite different from what would naturally be expected to follow from combining such substances. For example, we have found that when cresol or commercial cresylic acid is mixed with other known treating agents, it generally acts as an inert diluent, and that the efficiency of the treating agent is reduced by its admixture with the cresol or cresylic acid. Moreover, there are numerous instances where the cresol or cresylic acid is distinctly harmful in that it not only acts as a diluent, but even appears to retard the treating effect of the agent with which it is mixed.

We have discovered, however, a number of specific classes of agents having recognized treating value, which, when mixed with cresol or cresylic acid, produce a demulsifying agent that is more effective than the individual agents with which the cresol is mixed. Also that the result or effect produced by such a mixture is not obvious and would not naturally be expected to follow from combining such agents with cresol or cresylic acid.

One mixture of the character above referred to that we have found to be very efficient for breaking petroleum emulsions consists of cresol or cresylic acid and modified fatty bodies obtained by the sulphonation of red oil, olive oil, or similar bodies, or a mixture thereof, so as to obtain a modified oleic acid, containing not less than 8% of sulpho-oleic acid, and preferably a higher proportion, the term "modified oleic acid bodies," as herein used, meaning derivatives obtained by chemical reaction and which bear a simple genetic relationship to the parent materials from which they were derived. This complex mass, either as a fatty acid or a salt or ester thereof, is mixed with cresol or cresylic acid in an amount usually not less than 10% by volume, and generally not over 35% per volume. Cresol or cresylic acid is a product of commerce that can be easily obtained in a state of technical purity, and in producing the demulsifying agent contemplated by our process, any of the isomeric forms of cresylic acid may be employed, or a mixture of the isomers can be used.

Having thus described our invention, what we claim as new and desire to secure by Letters Patent is:

1. A process for breaking petroleum emulsions, characterized by subjecting the emulsion to the action of a treating agent consisting of cresylic acid and modified oleic acid bodies containing an appreciable proportion of sulpho-oleic acid.

2. A process for breaking petroleum emulsions, characterized by subjecting the emulsion to the action of a treating agent consisting of modified oleic bodies containing an appreciable proportion of sulpho-oleic acid, mixed with an amount of cresylic acid, not less than 10% and not more than 35% of the mixture.

3. A process for breaking petroleum emulsions, characterized by subjecting the emulsion to the action of a treating agent consisting of cresylic acid and a salt of modified oleic acid bodies containing an appreciable proportion of sulpho-oleic acid.

4. A process for breaking petroleum emulsions, characterized by subjecting the emulsion to the action of a treating agent consisting of cresylic acid and a water soluble salt of modified oleic acid bodies containing an appreciable proportion of sulpho-oleic acid.

5. A process for breaking petroleum emulsions, characterized by subjecting the emulsion to the action of a treating agent consisting of cresylic acid and an ammonium salt of modified oleic acid bodies containing an appreciable proportion of sulpho-oleic acid.

MELVIN DE GROOTE.
BERNHARD KEISER.